B. HOLLOWELL, DEC'D.
E. E. VON STEIN, ADMINISTRATRIX.
AGRICULTURAL TRACTOR.
APPLICATION FILED JULY 7, 1920.
1,389,552.
Patented Aug. 30, 1921.
4 SHEETS—SHEET 4.
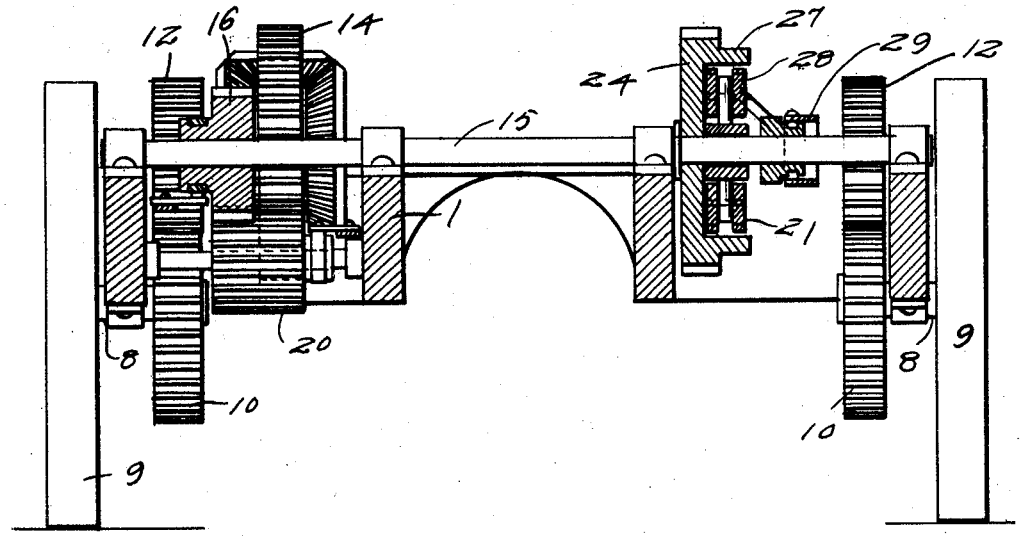
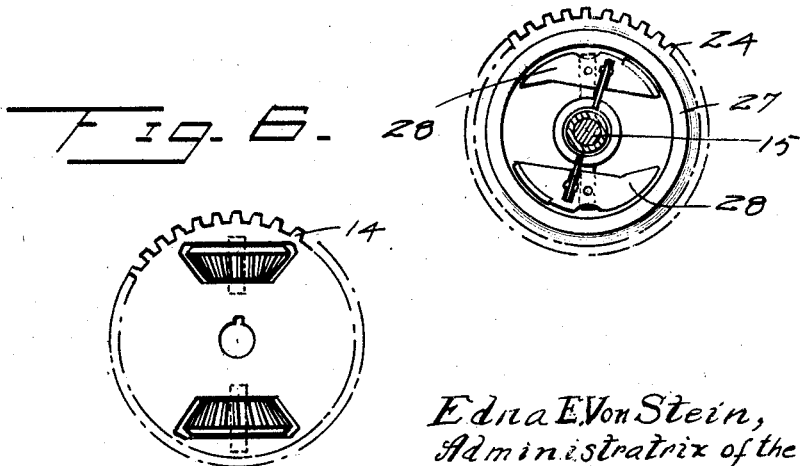
Edna E. Von Stein,
Administratrix of the estate of
B. Hollowell, deceased
INVENTOR.
BY
ATTORNEY.

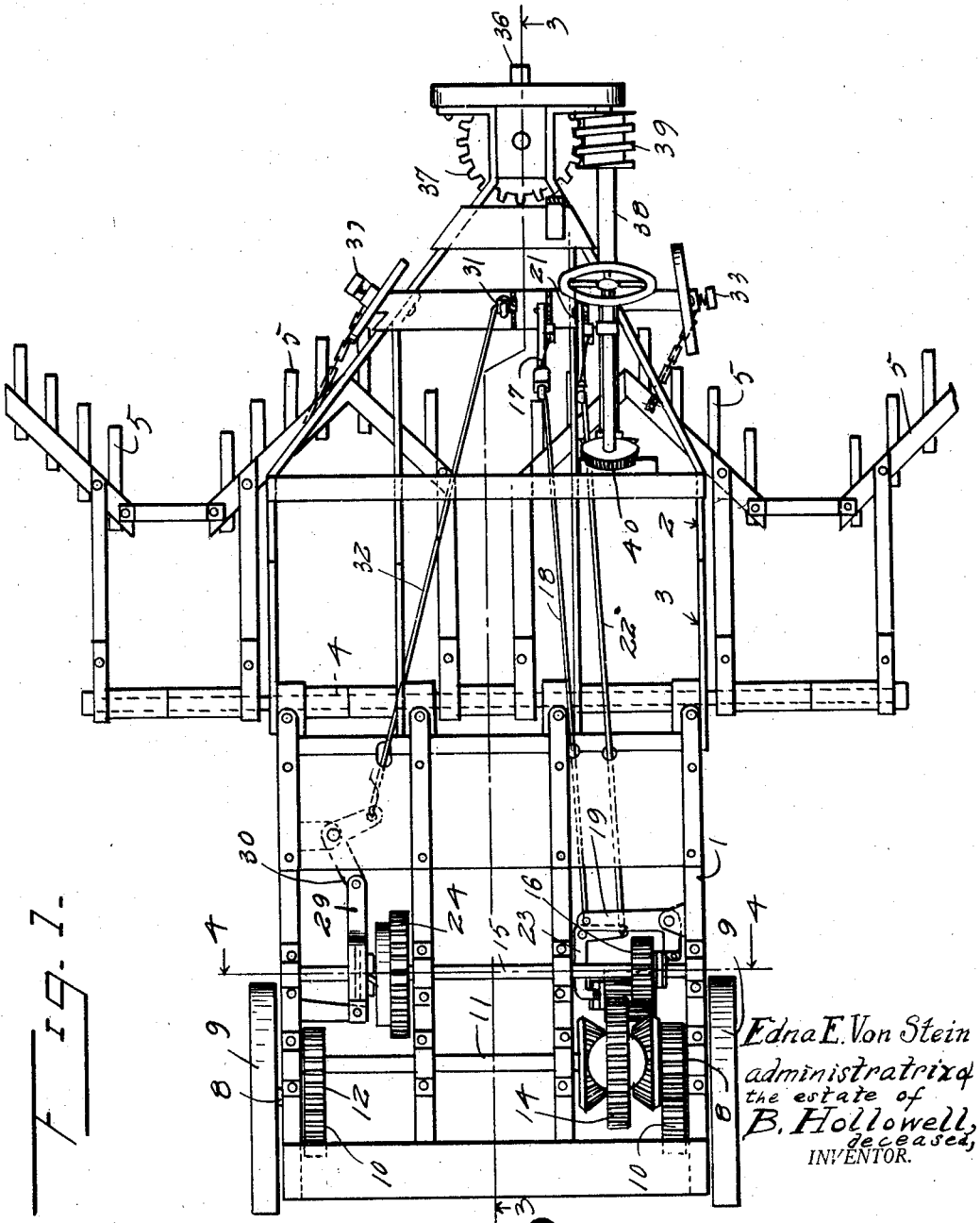

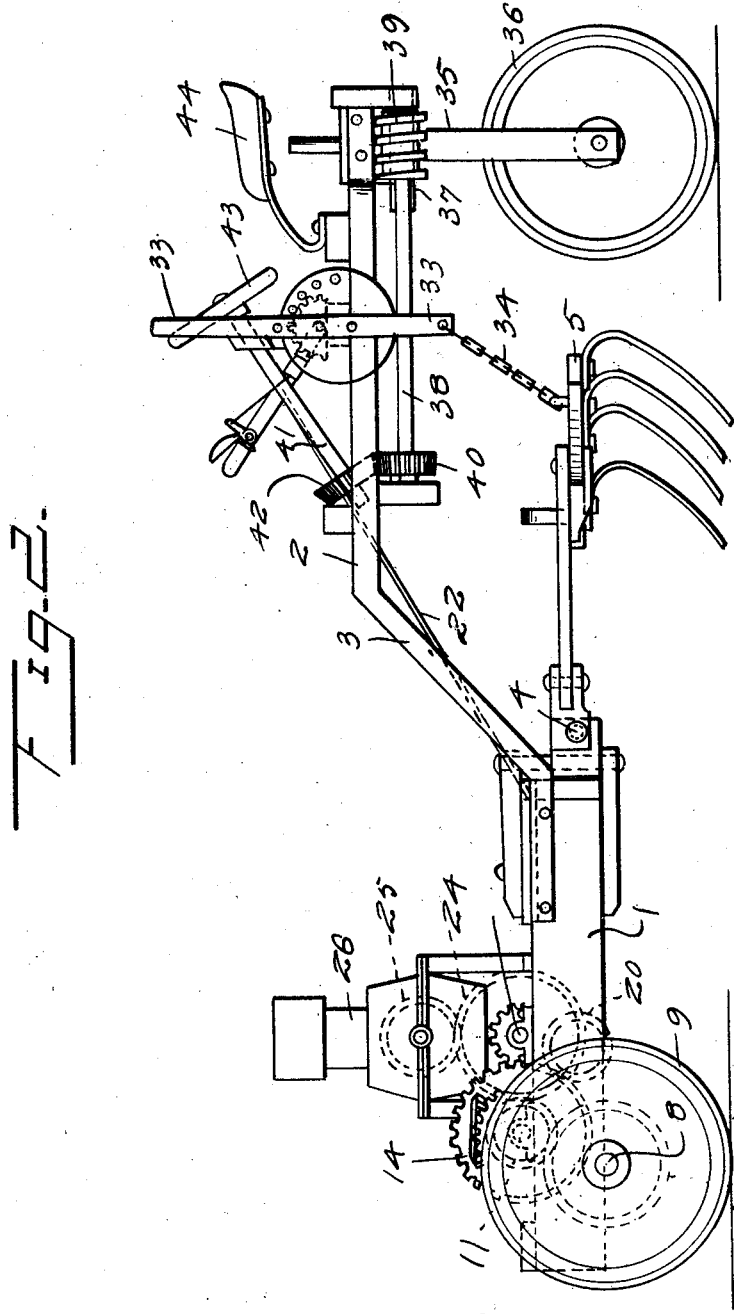

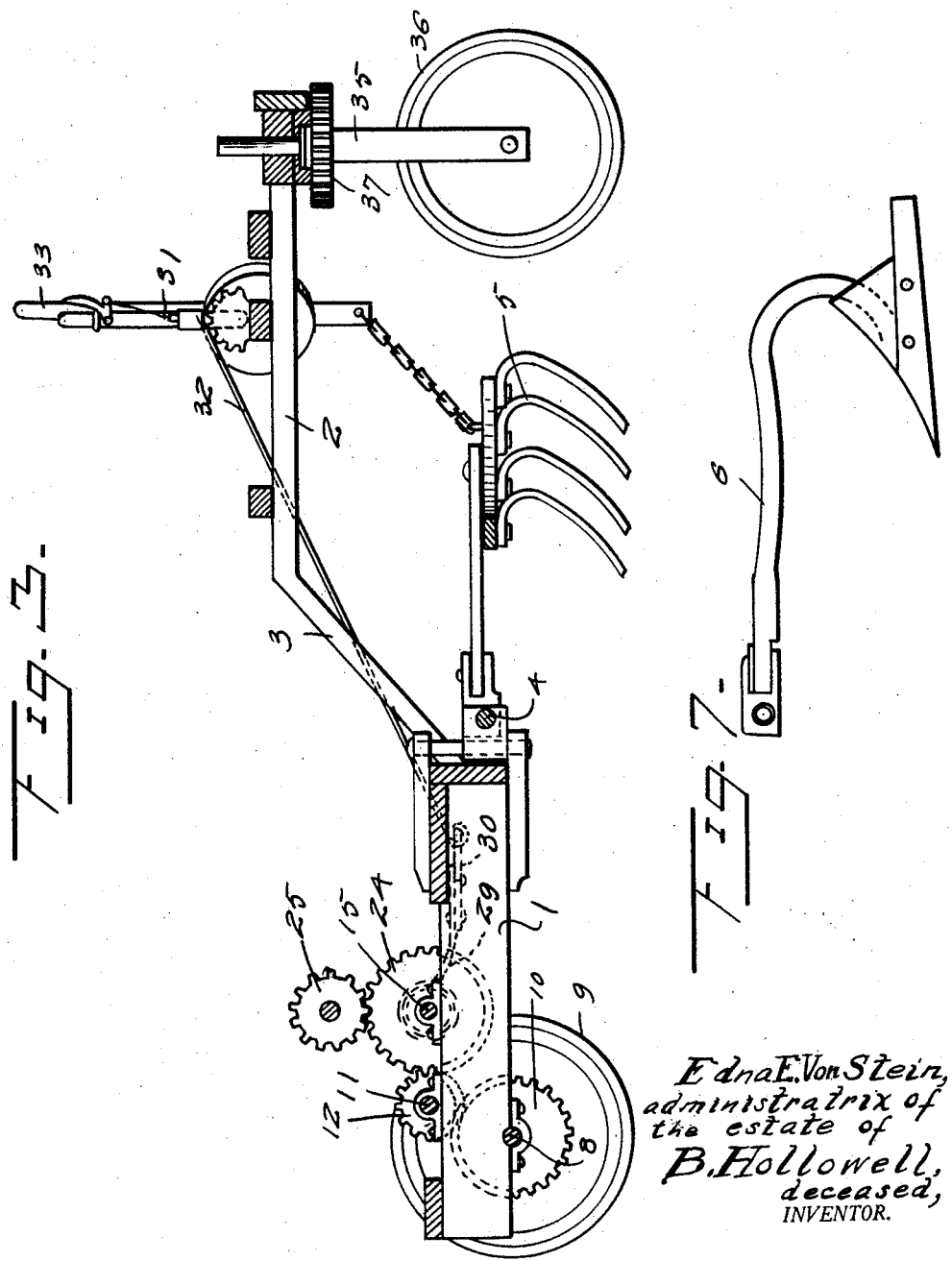

UNITED STATES PATENT OFFICE.

BENJAMIN HOLLOWELL, DECEASED, BY EDNA E. VON STEIN, ADMINISTRATRIX, OF CHESTER, WEST VIRGINIA.

AGRICULTURAL TRACTOR.

1,389,552.  Specification of Letters Patent.  Patented Aug. 30, 1921.

Application filed July 7, 1920. Serial No. 394,577.

*To all whom it may concern:*

I, EDNA E. VON STEIN, a citizen of the United States, residing at Chester, in the county of Hancock and State of West Virginia, administratrix of the estate of BENJAMIN HOLLOWELL, deceased, do hereby declare that the said BENJAMIN HOLLOWELL invented certain new and useful Improvements in Agricultural Tractors, do hereby declare the following to be a full, clear, and exact description of the said invention, such as will enable others skilled in the art to which it appertains to make and use the same.

This invention relates to agricultural tractors and it consists in the novel features hereinafter described and claimed.

An object of the invention is to provide a tractor of the character stated which may be conveniently used for drawing implements over a field at such times as the crops are being cultivated.

With this object in view the tractor comprises a frame having an engine mounted upon the forward portion thereof, the rear part of the frame is elevated with relation to the forward part thereof and a steering wheel is located on the rear elevated part of the frame. Means are provided for steering or directing the steering wheel. The agricultural implements which are attached to the tractor are connected with the rear edge of the lower forward portion of the frame and may operate under the rear elevated part of the frame. Lever mechanism is mounted upon the rear elevated part of the frame and may be operatively connected with the agricultural implements when used for raising or lowering the same.

Supporting wheels are journaled at the forward portions of the lower forward part of the frame and means are provided for operatively connecting the said supporting wheels with the engine. The said means include a compensating gear whereby the said supporting wheels may turn independently of each other, a reversing mechanism and means for interrupting the rotary movement from the engine shaft to the wheels to bring the machine to a state of rest while the engine continues to operate.

In the accompanying drawings:

Figure 1 is a top plan view of the tractor.

Fig. 2 is a side elevation of the same.

Fig. 3 is a longitudinal sectional view of the same.

Fig. 4 is a transverse sectional view of the same.

The other figures are detailed views of the features of the invention.

The tractor includes a frame which is composed of a lower forward portion 1, an elevated rear portion 2 with inclined portions 3 connecting the lower and elevated portions together. Shafts 4 or other suitable means, are carried at the rear edge of the lower portion 1 and with which cultivating teeth 5 or cultivating plows 6 may be connected. Stub axles 8 are mounted at the sides of the lower forward portion 1 and ground wheels 9 are fixed to the said stub axles. Gear wheels 10 are fixed to the stub axles 8. A shaft 11 is journaled at the forward portion of the lower part 1 of the frame and is provided at one end with a gear wheel 12 which meshes with one of the gear wheels 10. At the opposite end of the shaft 1 is journaled a gear wheel 13 which meshes with the other gear wheel. A compensating device or mechanism 14 is mounted upon the shaft 11 and is operatively connected with the gear wheel 13. Therefore as the shaft 11 rotates the wheels 9 are rotated but in the event that the tractor is making a turn one of the wheels 9 may rotate at a slower rate of speed than the other wheel and compensation for this difference in rotation is made by or through the compensating device 14 in a usual manner.

A shaft 15 is journaled upon the frame behind the shaft 11 and a gear wheel 16 is splined upon the shaft 15. A lever 17 is pivoted upon the rear portion of the frame and a rod 18 connects the lever 17 with a bell crank lever 19 pivoted upon the frame and the said bell crank lever is operatively connected with the gear wheel 16. Therefore it will be seen that by swinging the lever 17 the gear wheel 16 may be slid along the shaft 15. When the gear wheel 16 is at one position it is in mesh with the compensating device 14 and the said gear wheel 16 may be moved to a position where it is out of mesh with the said compensating device. A gear wheel 20 is journaled upon the frame at a point below the gear wheels 16 and the compensating device 14 the said gear wheel 20 is shiftable so that it may engage both the gear wheel and the compensating device 14 simultaneously and when the gear wheel 16 is out of mesh with the said compensating device. Therefore rotary movement may be transmitted from the gear wheel 16 to the compensating device 14 in a direction reverse to that in which the rotary movement in transmitted from the gear wheel to the said compensating device when they are in mesh with each other. A lever 21 is fulcrumed upon the rear part of the frame and a rod 22 is connected with the said lever and a bell crank lever 23 which in turn is operatively connected with the gear wheel 21. Therefore it will be seen that by swinging the lever 21 the rod 22 is moved longitudinally whereby the bell crank lever 23 is rocked and the gear wheel 20 is shifted.

A gear wheel 24 is loosely mounted upon the shaft 15 and meshes with a gear wheel 25 which is fixed to the shaft of the engine 26. A clutch flange 27 is fixed to the side of the gear wheel 24 and clutch member 28 are located within the flange 27 and may be moved into engagement with the said flange. A lever 29 is fulcrumed upon the forward portion of the frame and operatively connected with the clutch members and when swung will move the clutch members so that they will frictionally engage the flange 27. A bell crank lever 30 is fulcrumed upon the frame and operatively connected with the lever 29. The lever 31 is fulcrumed at the rear part of the frame of the machine and a rod 32 is connected with the lever 31 and with the bell crank lever 30. By swinging the lever 31 the rod 32 is moved longitudinally whereby the bell crank lever 30 is swung and the lever 29 is operated as hereinbefore described. Levers 33 are fulcrumed at the rear part of the frame of the tractor and chain sections 34 are connected with the lower ends of the levers 33. The said chain sections may be connected with the rear parts of the teeth 5 or the plows 6. It is apparent that by swinging the levers 33 the chains 34 will be moved longitudinally and hence means are provided for raising or lowering the teeth 5 or the plows 6 with relation to the ground.

A yoke 35 is pivoted at the rear portion of the elevated part 2 of the frame and is disposed at one side of the median center of the frame of the machine. A wheel 36 is journaled between the lower end portions of the yoke 35 and is adapted to travel upon the surface of the soil. A gear wheel 37 is fixed to the upper portion of the yoke 35. A shaft 38 is journaled upon the elevated portion 2 of the frame and carries a worm 39 which meshes with the gear wheel 37. A pinion 40 is fixed to the forward portion of the shaft 37. A steering shaft 41 is journaled at the elevated portion 2 of the frame and carries at its lower end a gear wheel 42, and meshes with the pinion 40 upon the shaft 38. The shaft 41 carries at its upper end a steering wheel 43 which is within reach of the person who occupies the seat 44 mounted upon the rear part 2 of the frame of the machine.

Therefore it is apparent that as the shaft 41 is turned by using the wheel 43 the intermeshing gear wheel 42 and pinion 40 will rotate the shaft 38 whereby the worm 39 which is in mesh with the gear wheels 37 will turn the yoke 35 and consequently the wheel 36 is steered or directed.

In operation the machine is passed over a row of plants and the plants are in a line which is directly under the median longitudinal dimension of the frame of the machine. Therefore the steering wheel is at one side of the row of plants and may be freely manipulated without coming in contact with the plants. The soil engaging elements as for instance the teeth 5 or the plows 6 will operate in the soil at the opposite sides of the row of plants and will cultivate the soil or will cast the soil toward or away from the plants as desired or as conditions may require.

From the foregoing description taken in conjunction with the accompanying drawings it will be seen that an agricultural tractor of simple and durable structure is provided and that the same may be economically and conveniently used for cultivating plants while the same are standing in rows in the soil.

Having thus described the invention, what is claimed is:

1. A tractor comprising a frame having a forward relatively low portion and a rear elevated portion, wheels journaled at the forward low portion of the frame, an engine mounted upon the low portion of the frame, means operatively connecting the engine with the wheels, a dirigible wheel located under the rear elevated portion of the frame, and means carried at the rear edge of the lower forward portion of the frame for attachment with implements whereby the implements may operate under the rear elevated portion of the frame.

2. A tractor comprising a frame consisting of a relatively low forward portion and an elevated rear portion, wheels journaled at the lower forward portion of the frame, an engine mounted upon the lower forward portion of the frame, means operatively connecting the engine with the wheels, a dirigible wheel located under the rear elevated portion of the frame, means carried at the rear edge of the low forward portion of the frame and adapted to be connected with implements, and lever mechanisms mounted upon the rear elevated portions of the frame and adapted to be connected with the implements and operable to raise and lower the implements.

In testimony whereof, I affix my signature in the presence of two witnesses.

EDNA E. VON STEIN,
*Administratrix of Benjamin Hollowell, deceased.*

Witnesses:
HARRY S. HOBBS,
O. O. ALLISON.